(12) United States Patent
Dahl et al.

(10) Patent No.: US 11,352,883 B2
(45) Date of Patent: Jun. 7, 2022

(54) IN-SITU RHEOLOGY BEHAVIOR CHARACTERIZATION USING DATA ANALYTICS TECHNIQUES

(71) Applicants: Thomas Dahl, Schwulper (DE); Roland May, Celle (DE); Reza Ettehadi Osgouei, Conroe, TX (US); Rosa Swartwout, Spring, TX (US); Dennis Clapper, Houston, TX (US)

(72) Inventors: Thomas Dahl, Schwulper (DE); Roland May, Celle (DE); Reza Ettehadi Osgouei, Conroe, TX (US); Rosa Swartwout, Spring, TX (US); Dennis Clapper, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 677 days.

(21) Appl. No.: 15/600,100

(22) Filed: May 19, 2017

(65) Prior Publication Data

US 2018/0334905 A1  Nov. 22, 2018

(51) Int. Cl.
*E21B 49/08* (2006.01)
*E21B 47/26* (2012.01)

(52) U.S. Cl.
CPC .......... *E21B 49/087* (2013.01); *E21B 47/26* (2020.05); *E21B 49/0875* (2020.05)

(58) Field of Classification Search
None
See application file for complete search history.

(56) References Cited

U.S. PATENT DOCUMENTS

| | | | |
|---|---|---|---|
| 6,176,323 B1 | 1/2001 | Weirich et al. | |
| 2003/0084717 A1 | 5/2003 | Herzhaft et al. | |
| 2010/0148048 A1* | 6/2010 | Abbas | G01N 21/274 250/252.1 |
| 2011/0185795 A1 | 8/2011 | Colquhoun | |
| 2015/0330213 A1 | 11/2015 | van Oort et al. | |
| 2016/0341646 A1* | 11/2016 | Jamison | E21B 47/00 |
| 2017/0204689 A1* | 7/2017 | Dykstra | G05B 19/042 |
| 2018/0100392 A1* | 4/2018 | Kleinguetl | E21B 49/088 |
| 2019/0227048 A1* | 7/2019 | Ye | E21B 21/062 |

OTHER PUBLICATIONS

Notification of Transmittal of International Search Report and Written Opinion of International Searching Authority cited in Application No. PCT/US2018/031932 dated Nov. 1, 2018, 12 pages.

* cited by examiner

*Primary Examiner* — Brent A. Fairbanks
(74) *Attorney, Agent, or Firm* — Cantor Colburn LLP

(57) ABSTRACT

Examples of techniques for performing a wellbore construction operation in a wellbore are disclosed. In one example implementation according to aspects of the present disclosure, a computer-implemented method includes: performing a rheology test on a test fluid, the test fluid being representative of a fluid pumped through the wellbore, to generate test fluid data; performing, by the processing device, a data analysis on the test fluid data to generate at least one parameterized correlation; measuring a first property of the fluid to generate measured data; calculating, by the processing device, a second property of the fluid in the wellbore by using the parameterized correlations and the measured data to generate calculated data; and changing a parameter of the wellbore construction operation based at least in part on the calculated data.

17 Claims, 6 Drawing Sheets

300

```
┌─────────────────────────────────────────────────────────┐
│   Perform Data Analysis On Drilling Fluid Data To Generate │
│              Parameterized Correlations                 │
│                                                    302  │
└─────────────────────────────────────────────────────────┘
                            │
                            ▼
┌─────────────────────────────────────────────────────────┐
│   Apply The Parameterized Correlations To Results Of A  │
│   Standard Drilling Fluid Test At A Wellbore To Predict │
│   Rheological Data For The Drilling Fluid At The Wellbore│
│                                                    304  │
└─────────────────────────────────────────────────────────┘
                            │
                            ▼
┌─────────────────────────────────────────────────────────┐
│    Changing A Parameter Of A Drilling Operation At The  │
│  Wellbore Based At Least In Part On The Rheological Data Of│
│                    The Drilling Fluid                   │
│                                                    306  │
└─────────────────────────────────────────────────────────┘
```

*FIG. 3*

| Table 1 Summary of Retrieved Data | | |
|---|---|---|
| Mud Type | Number of Data | Regional Lab |
| Oil-Based Drilling Fluid- Fluid A | 3000 | Regional Lab (1) |
| Oil-Based Drilling Fluid- Fluid A | 250 | Regional Lab (2) |
| Oil-Based Drilling Fluid- Fluid B | 1700 | Regional Lab (1) |
| Synthetic-Based Mud- Fluid C | 1200 | Regional Lab (1) |
| Synthetic-Based Mud- Fluid C | 100 | Regional Lab (2) |
| Synthetic-Based Mud-R Fluid D | 4445 | Regional Lab (1) |

*FIG. 4*

| Mud Properties | Lab Report 150°F |
|---|---|
| Density, lb/gal @ 72°F | 16.8 |
| Plastic Viscosity, cP | 34 |
| Yield Point, lb/100 ft² | 9 |
| Initial Gel Strength, lb/100 ft² | 6 |
| 10 min. Gel Strength, lb/100 ft² | 9 |
| | |
| HTHP@300°F, cc | 2.0 |
| AgNO3, mL/1cc mud | 1.3 |
| EDTA, mL/1cc mud | 1.2 |
| Volume Percent Oil, % | 54.0 |
| Volume Percent Water, % | 9.0 |
| Volume Percent Solids, % | 37.0 |
| Electric Stability Meter (23D), Volts | 832 |
| Pom, mL/1cc mud | 0.3 |
| Drilled Solids S. G., g/cc | 2.6 |
| Weight Material S. G., g/cc | 4.2 |
| Base Oil Density, lb/gal | 7.00 |
| | |
| Total Lime, lbm/bbl | 0.39 |
| CaCl2, lbm/bbl | 7.14 |
| CaCl2, % by weight | 18.49 |
| CaCl2, ppm | 184,856 |
| Brine S. G., g/cc | 1.16 |
| Brine volume, % | 9.51 |
| Corrected Solids volume, % | 36.49 |
| Oil Water Ratio (Oil/Water) | 86/14 |
| Brine Water Ratio (Oil/Water) | 85/15 |
| Average Solids S. G., g/cc | 3.97 |
| Weight Material volume, % | 31.32 |
| Weight Material, lbm/bbl | 460.45 |
| Low Gravity Solids volume, % | 5.16 |
| Low Gravity Solids, lbm/bbl | 46.98 |
| | |
| Rheology 600 RPM | 77 |
| Rheology 300 RPM | 43 |
| Rheology 200 RPM | 31 |
| Rheology 100 RPM | 19 |
| Rheology 6 RPM | 5 |
| Rheology 3 RPM | 4 |

*FIG. 5*

IN-SITU RHEOLOGY BEHAVIOR CHARACTERIZATION USING DATA ANALYTICS TECHNIQUES

BACKGROUND

The present disclosure generally relates to well construction and operations and, more particularly, relates to determination of rheological properties of wellbore fluids along a well using data analytics techniques. Construction of a well includes the process to drill a borehole, placing and cementing casing or liner strings in a wellbore, and installing completion and production equipment within the wellbore. Well operations include activities such as running or tripping any type of drill, fishing, casing, liner, completion, or production string in or out of a wellbore, including re-entry drilling. A wellbore fluid can be at rest, being not circulated, or is circulated within the wellbore either through a string down and up an annulus or down a wellbore and up within the string.

Accurate determination and knowledge of wellbore fluid rheological properties at any pressure and temperature, including low and high-temperature conditions for deep water environments, is useful for designing hydraulic programs and for managing potential problems during a drilling operation. It becomes even more useful during deep-water or depleted reservoir drilling when a "narrow pressure window" is present. A pressure window is framed by either the formations maximum pore pressure gradient or the formations shear failure gradient, whichever is higher, on the low pressure side and by the minimum formation fracture gradient on the upper pressure side. The pressure window is used while constructing a well and can be determined for any point within an open-hole interval.

SUMMARY

According to examples of the present disclosure, techniques including methods, systems, and/or computer program products for performing a wellbore construction operation in a wellbore are provided. An example of a computer-implemented method includes: performing a rheology test on a test fluid, the test fluid being representative of a fluid pumped through the wellbore, to generate test fluid data; performing, by the processing device, a data analysis on the test fluid data to generate at least one parameterized correlation; measuring a first property of the fluid to generate measured data; calculating, by the processing device, a second property of the fluid in the wellbore by using the parameterized correlations and the measured data to generate calculated data; and changing a parameter of the wellbore construction operation based at least in part on the calculated data.

According to another embodiment, an example system for performing a wellbore construction operation in a wellbore includes a rheology test setup configured to determine test data of a test fluid, a sensor or measurement device to measure a first property of a fluid flowing through a wellbore, a memory including computer readable instructions, and a processing device for executing the computer readable instructions for performing a method. The method includes: performing, by the processing device, a data analysis on the test fluid data to generate at least one parameterized correlation; calculating, by the processing device, a second property of the fluid in the wellbore by using the at least one parameterized correlation and the measured first property of the fluid to generate calculated data; and changing a parameter of the wellbore construction operation based at least in part on the calculated data.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

FIG. 3 depicts a flow diagram of a method for generating parameterized correlations for wellbore fluid according to examples of the present disclosure;

FIG. 4 depicts a table of wellbore fluids according to examples of the present disclosure;

FIG. 5 depicts a table of wellbore fluid properties according to examples of the present disclosure.

DETAILED DESCRIPTION

Figure 1:
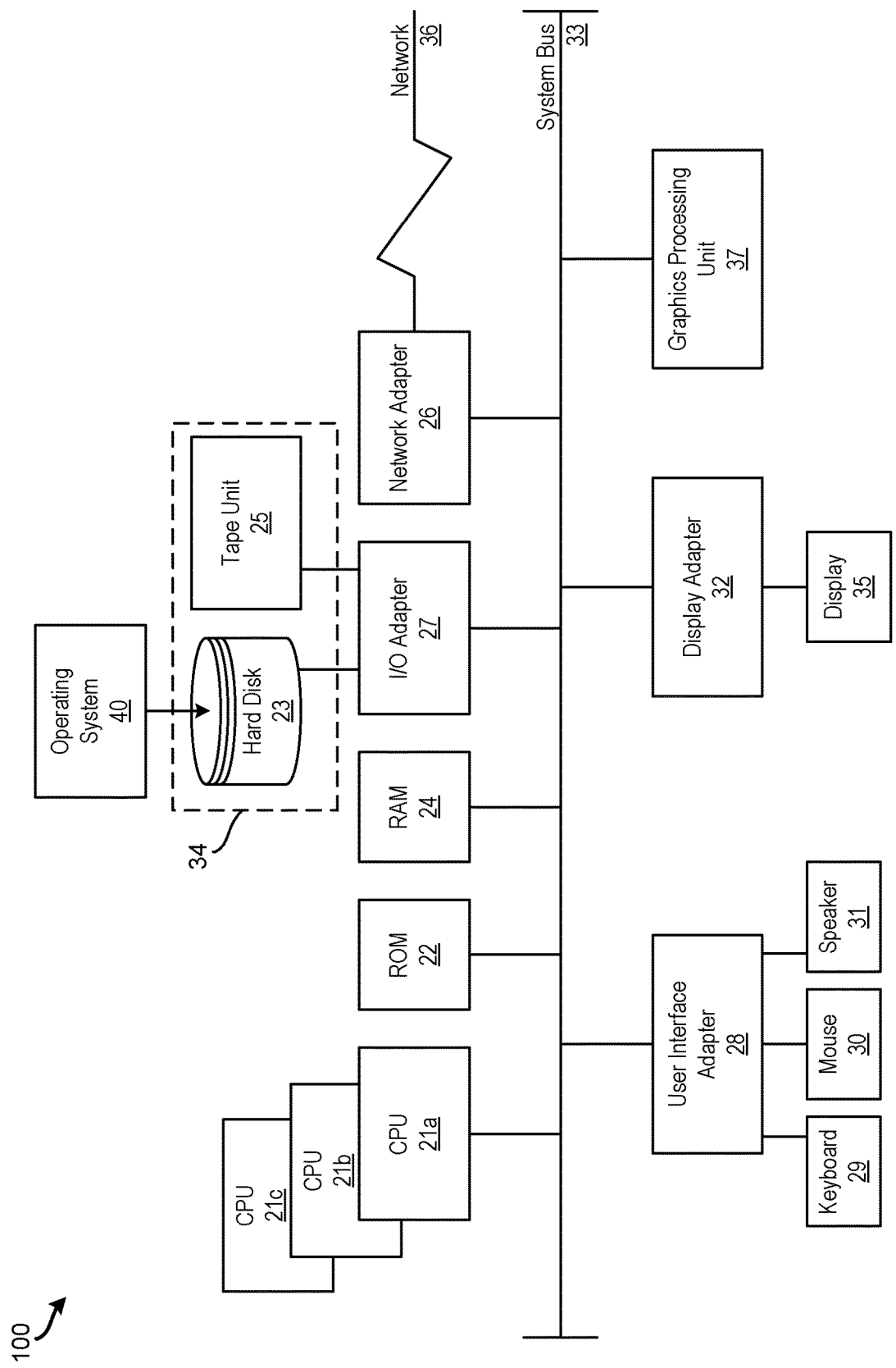
FIG. 1 depicts a block diagram of a processing system for implementing the techniques described herein according to examples of the present disclosure.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood that embodiments of the present invention are capable of being implemented in conjunction with any other suitable type of computing environment now known or later developed. For example, FIG. 1 illustrates a block diagram of a processing system 100 for implementing the techniques described herein. In examples, processing system 100 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 100.

Further illustrated are an input/output (I/O) adapter 27 and a network adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 may be stored in mass storage 34. The network adapter 26 interconnects system bus 33 with an outside network 36 enabling processing system 100 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in the processing system 100.

Turning now to an overview of technologies that are more specifically relevant to aspects of the invention, traditional industry techniques used rheology tests to determine wellbore fluid rheological properties at different combinations of pressure and temperature. Rheology is the study of the flow of matter, primarily in a liquid state. Theoretical aspects of rheology are the relation of the flow/deformation behavior of material and its internal structure (e.g., the orientation and elongation of polymer molecules), and the flow/deformation behavior of materials that cannot be described by classical fluid mechanics or elasticity. Rheology generally accounts for the behavior of non-Newtonian fluids, by characterizing the minimum number of functions that are needed to relate stresses with rate of change of strain or strain rates.

Most commonly, the viscosity (the measure of a fluid's ability to resist gradual deformation by shear or tensile stresses) of non-Newtonian fluids is dependent on shear rate or shear rate history. Non-Newtonian fluids can be studied through several other rheological properties that relate stress and strain rate tensors under many different flow conditions which are measured using measurement devices such as rheometers. The properties can be studied using tensor-valued constitutive equations.

Rheological properties are measured by using temperature and pressure controlled viscometer However, a full wellbore fluid check with the determination of all relevant temperature and pressure dependent rheological parameters is usually only carried out for offshore and ultra-high temperature, high pressure (HTHP) wells and is rarely carried out for conventional wellbore construction. It may also be augmented with one or two full HTHP analysis during the entire wellbore construction operation. The testing process, including collecting rig-site samples, sending the samples to a laboratory, conducting tests and preparing the report, is time-consuming and highly dependent on the laboratory engineer carrying out the tests. A more practical approach for a continuous estimation of the wellbore fluid temperature and pressure dependent rheological properties is desired to provide suitable inputs for hydraulic modeling during well planning, and for real-time monitoring, modeling, calibration and control during wellbore construction operations.

Various implementations are described below by referring to several examples of determining rheological properties of wellbore fluids along a well using data analytics techniques. The present techniques utilize the combination of big data analytics, data extraction, data mining techniques, data extraction techniques, stochastic techniques, and other methods (e.g., stochastic analysis, neural networks, topological data analysis) designed to predict wellbore fluid rheological properties in a downhole environment using data extracted from, for example, field service laboratory reports. Accordingly, the present techniques identify the variables affecting the temperature and pressure dependent rheological properties of water-, synthetic-, and oil-based drilling fluids, cements used during casing and liner installations, and any type of completion and production fluid circulated within the wellbore to develop an analytics based model defining the relationship between variables measured in wellbore fluid check tests and temperature and pressure dependent viscometer data by using data mining and data analytics.

Laboratory tests such as rheology tests on wellbore fluid data are performed to measure the properties of a test fluid (e.g., using rheological test setup) that is representative of the fluid in the wellbore. Typical test fluids samples may be of the same or a similar chemical composition as the actual fluid that is used in the wellbore. They may comprise fluids from other wellbores or synthetic samples that are produced in a laboratory. Data analysis techniques are used such as analytics, stochastic methods, analytical methods, constraints, and the like to generate parameterized correlations. The parameterized correlations are then used to determine in-situ pressure and temperature rheology behavior, which are useful for designing a wellbore fluid (i.e., fluid composition), and/or for manipulating wellbore construction operations in the well. For example, a hole cleaning process can be initiated when the cuttings transport capability of a drilling fluid to transport the cuttings out of the borehole with the required efficiency. As another example, the composition of a pumped fluid may be adjusted to ensure that parameters such as but not limited to viscosity, shear stress, density are with a required window to ensure smooth and flawless operations. For instance, the percentage of a component of the fluid may be changed by adding or removing that component to or from the fluid. As yet another example, hydraulic modeling, monitoring, and calibration can be performed.

Accordingly, the present techniques enable accurate determination and knowledge of wellbore fluid rheological properties at different pressures and/or temperatures. Several potential applications of the present techniques are as follows: hydraulic modeling during well planning and for real-time monitoring, modeling, calibration, and control during wellbore construction; accurately predicting equivalent static density (ESD), equivalent circulating density (ECD); and improved and accelerated designing of wellbore fluids for well operations. According to some examples, the present techniques can be applied to hydraulics modeling, monitoring, and adjustment of fluids' formulation, and cuttings removal in a wellbore while drilling, while circulating, during pump shut-in, when tripping, while displacing another fluid, when injecting to formations, for segregation of solids, and the like or suitable combinations thereof.

It is useful to monitor the wellbore fluid temperature and pressure dependent rheological properties to minimize fluctuations in the equivalent static density (ESD) and equivalent circulating density (ECD) and to prevent wellbore fluid losses to the formation, undesired influx of fluids from the formation and borehole breakouts. Rheological changes at any combination of pressures and temperatures could be symptoms of costly drilling problems which could potentially affect wellbore stability and safety. The early detection of these symptoms in the field by conducting basic mud check tests can prevent possible well incidents and decrease non-productive time.

The teachings of the present disclosure can be applied in a variety of wellbore construction operations. Wellbore construction operations may include operations that are suitable to generate, maintain, or abandon a wellbore. In particular, wellbore construction operations may include drilling the wellbore, completing the wellbore, fracturing the formation, stimulating the formation, cleaning the wellbore, and at least partially cementing the wellbore. Wellbore construction operations may involve installing and/or using equipment such as drilling tools, completion tools, whipstocks, casings, liner, pumps, valves, sensors, measurement devices, coring tools, logging tools, perforation guns, tubings, packers or other equipment known in the art in the wellbore. These operations may involve pumping, injecting or otherwise using one or more fluids through or in at least a part of the borehole such as treatment agents to treat a formation, the fluids resident in a formation, a wellbore, and/or equipment in the wellbore. The injected or pumped fluids may be in the form of liquids, gasses, solids, semi-solids, and mixtures thereof. Other illustrative fluids that are used in wellbore construction operations include, but are not limited to, fracturing fluids, acids, steam, water, brine, anti-corrosion agents, cement, permeability modifiers, drilling muds, emulsifiers, demulsifiers, tracers, flow improvers, stimulation fluids, etc. Other illustrative wellbore operations include, but are not limited to, tracer injection, acidizing, steam injection, water-flooding, cementing, etc.

Figure 2:
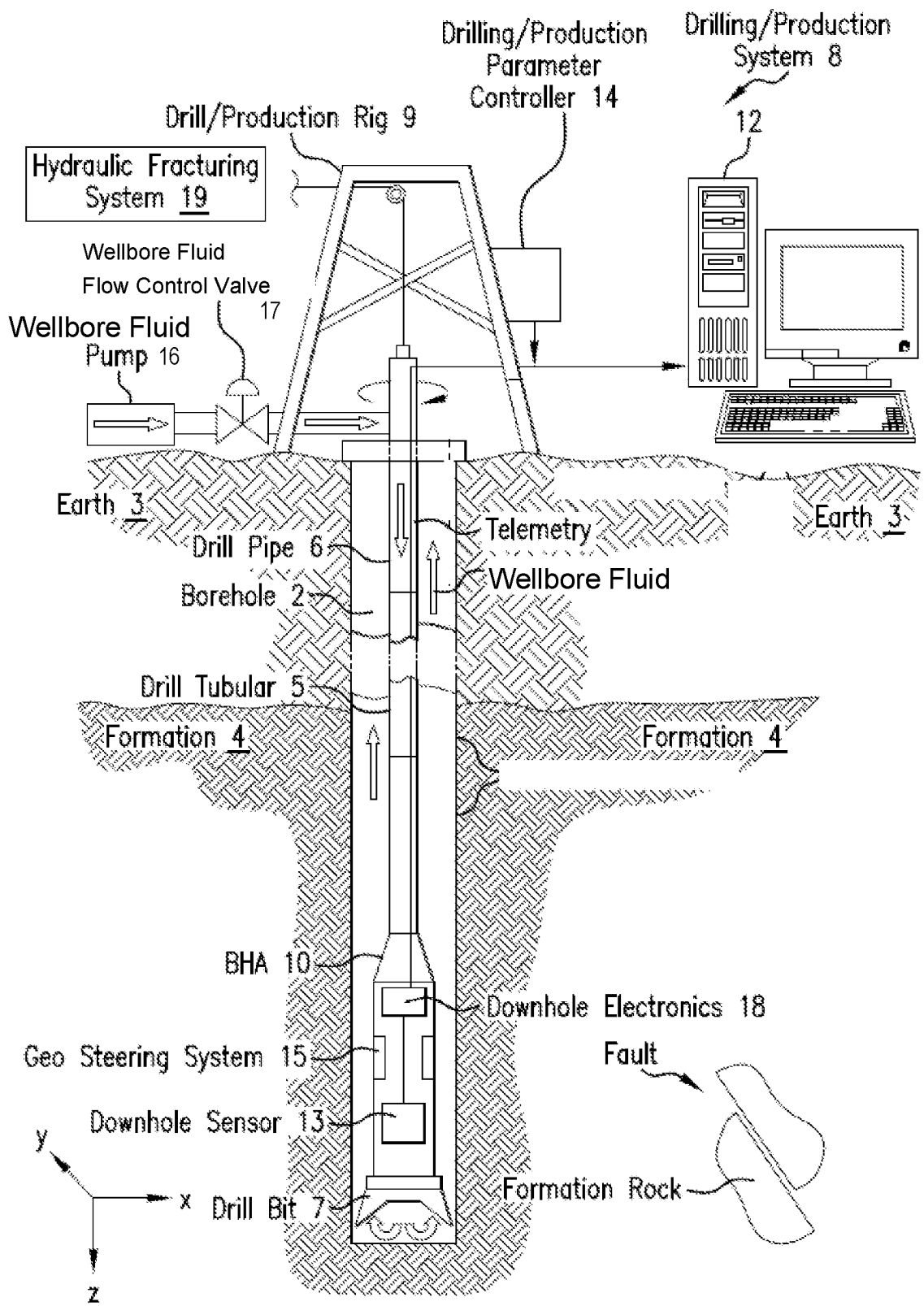
FIG. 2 depicts a cross-sectional view of a borehole penetrating the earth having a formation according to examples of the present disclosure.

Apparatus for implementing the disclosure and features related to the disclosure is now discussed. FIG. 2 depicts a cross-sectional view of a borehole 2 penetrating the earth 3, which includes a formation 4, according to embodiments of the present invention. The formation 4 includes formation rock that has faults or fractures.

A drilling/production system 8 includes a drill/production rig 9 that is configured to drill the borehole 2 and/or extract hydrocarbons from the formation 4 via the borehole 2. The drilling/production system 8 can also be used for geothermal or injection wells. A drill bit 7 is disposed at the distal end of a drill tubular 5 for drilling the borehole 2. The drill tubular 5 may be a drill string made up of a plurality of connected drill pipes 6. According to some examples, wellbore fluid or mud is pumped through the drill tubular 5 to lubricate the drill bit 7 and flush cuttings from the borehole 2. The wellbore fluid is pumped by a wellbore fluid pump 16 and a flow rate of the wellbore fluid is controlled by a wellbore fluid control valve 17. The wellbore fluid pump 16 and wellbore fluid flow control valve 17 may be controlled by a drilling/production parameter controller 14 to maintain a suitable pressure and flow rate to prevent the borehole 2 from collapsing.

Suitable fluid pressure and flow parameters may be determined by knowing the stresses of the formation rock, which can be determined from representation of the surfaces of the formation rock. The drilling/production parameter controller 14 is configured to control, such as by feedback control for example, parameters used to drill the borehole 2 and/or extract hydrocarbons via the borehole 2. Suitable flow rate for extraction may be determined from knowing the porosity of the formation rock, which can be determined from representation of the surfaces of the formation rock.

According to some examples, the drill tubular 5 includes a bottomhole assembly (BHA) 10. However, in some examples, non-drilling strings may not include a bit and/or a BHA. The BHA 10 includes a downhole sensor 13 configured for sensing various downhole properties or parameters related to the formation 4, the borehole 2, and/or position of the BHA 10. Sensor data may be transmitted to the surface by telemetry for processing such as by the processing system 12. The BHA 10 may also include a geo-steering system 15. The geo-steering system 15 is configured to steer the drill bit 7 in order to drill the borehole 2 according to a selected path or geometry. The path or geometry in general is selected to optimize hydrocarbon production from the borehole 2 and to ensure that the stress on the formation due to the borehole along the path does not exceed the strength of the formation material. The optimized geometry may be determined from representation of the surfaces of the formation rock.

Steering commands may be transmitted from the drilling/production parameter controller 14 to the geo-steering system 15 by the telemetry. Telemetry in one or more embodiments may include mud-pulse telemetry, electromagnetic (EM) telemetry, or wired drill pipe. Downhole electronics 18 may process data downhole and/or act as an interface with the telemetry. FIG. 2 also illustrates a hydraulic fracturing system 19 that is configured to fracture rock of the formation 4 by pumping fracturing fluid at high pressure into the borehole 2.

FIG. 3 depicts a flow diagram of a method 300 for generating parameterized correlations for drilling fluid according to examples of the present disclosure. The method 300 can be performed by a suitable processing system, such as the processing system 100, the controller 11, or by another suitable processing system.

At block 302, the method includes performing data analysis on wellbore fluid data to generate parameterized correlations, wherein the wellbore fluid data is based at least in part on results of a plurality of full fluid tests to pressure and temperature dependent rheological parameters of a wellbore fluid. The full borehole fluid tests are performed on various wellbores and can include collecting samples, sending the samples to a laboratory for analysis, conducting test at the laboratory, and preparing results of the tests. This process is time-consuming and highly dependent on the engineer carrying out the tests.

The full wellbore fluid tests can be performed on a variety of types of borehole fluid and multiple data points can be collected and analyzed for each type of wellbore fluid, as depicted in table 400 of FIG. 4. For each borehole fluid, various properties can be tested, as depicted in table 500 of FIG. 5.

Parameterized correlations are generated from these full tests by performing data analytics using statistical techniques and computational intelligence techniques. Algorithms may describe viscometer readings at different temperature or pressure combination as a function of one or more wellbore fluid (i.e., mud) weight at a particular temperature, density at a particular temperature, volume percent of oil (e.g. volume percent of base oil, mass percent of oil), viscometer readings at a particular temperature, fluid yield stress at a particular temperature, concentration of salt (e.g. concentration of salt in the internal phase), oil-water-ratio, concentration of all or a part of solid particles in fluid (e.g. concentration of low density or high density solid particles in fluid), and/or temperature and pressure, or combinations thereof.

The algorithms are derived from experimental data (i.e., the results of the full tests) using several techniques such as but not limited to statistical techniques including step-wise regression, robust regression, curve fitting, classification techniques, and computational intelligence techniques such as neural networks. The parameterized correlation can include an analytic equation describing the second parameter as a function of the first parameter. For example, such an analytic equation may have the general form of:

$$\theta_H = \sum_{i=1}^{N} a_i f_i(\alpha_i)$$

wherein $\theta_H$ is the predicted reading of a viscosimeter at different temperature or pressure combinations, N is the number of summands in the algorithm, $\alpha_i$ is a fitting parameter, $f_i(\alpha_i)$ is an analytic function that depends of the variable $\alpha_i$ and the variable $\alpha_i$ is a property of the drilling fluid. For example, $\alpha_i$ can be wellbore fluid (i.e., mud) weight at a particular temperature, density at a particular temperature, volume percent of oil (e.g. volume percent of base oil, mass percent of oil), viscometer readings at a particular temperature, fluid yield stress at a particular temperature, concentration of salt (e.g. concentration of salt in the internal phase), oil-water-ratio, concentration of all or a part of solid particles in fluid (e.g. concentration of low density or high density solid particles in fluid), and/or temperature and pressure, or combinations thereof.

The functions $f_i(\alpha_i)$ may include any form of analytical function such as but not limited to polynoms of $\alpha_i$ including linear polynoms, polynoms that have only one summand, or constant polynoms, logarithms of $\alpha_i$, exponential functions of $\alpha_i$ and may include other variables $\alpha_j$ ($j \neq i$) or parameters that may vary with temperature or pressure, or parameters that do not depend on temperature and/or pressure.

In one embodiment, one or more of the functions $f_i(\alpha_i)$ are monotonic functions of $\alpha_i$. In another embodiment, the functions $f_i(\alpha_i)$ include a product, a sum, a difference, or a ratio of $\alpha_i$ and another variable $\alpha_j$, ($j \neq i$).

Figure 6:
FIG. 6 depicts a table of viscometer data and different combinations of temperature and pressure as predicted based on the generated parameterized correlations according to examples of the present disclosure.

At block 304, the method includes applying the parameterized correlations to results of a standard (or basic) borehole fluid test at a wellbore to predict temperature and pressure dependent viscosity data for the borehole fluid at the wellbore. Using the generated parameterized correlations and a standard wellbore fluid check test results, the temperature and pressure dependent rheological properties of a wellbore fluid can be predicted. FIG. 6 depicts a table of 600 of temperature and pressure dependent viscometer data as predicted based on the generated parameterized correlations being applied to a standard wellbore fluid test.

According to the table 600, the readings in the dial readings 603 represent viscometer data which can be predicted using the parameterized correlations described herein at the corresponding temperatures 601 and pressures 602. That is, in order to apply correlations, the temperatures 601 and pressures 602 should be known. The plastic viscosity 604 and the yield point 605 can be calculated based on the viscometer data.

It should be appreciated that the standard (or basic) wellbore fluid test is a less time consuming, less detailed test (or set of tests) than the full borehole fluid tests. The standard (or basic) wellbore fluid test may be performed by a technician/engineer at the well site instead of in the laboratory, as in the case of a full borehole fluid test. The predicted temperature and pressure dependent viscosity data can also help the field service engineer to design and to optimize the wellbore fluid and to estimate the borehole fluids additives effects on temperature and pressure dependent rheological properties.

According to some examples, other parameters (i.e., properties) can also be predicted, including, for example, salt concentration, a liquid composition, a weight of the fluid, a density of the fluid, a solid mass or volume percentage, an oil-water ratio, a phase ratio of organic-to-inorganic matter, a concentration (e.g., mass, substance amount, and/or volume) of organic or inorganic phases, a viscometer reading, a temperature, and a pressure. Accordingly, new drilling fluid can be designed or existing drilling fluid can be improved to improve the existing fluid performance. If a field engineer or lab scientist knows what should be the viscometer data at bottom hole conditions for a given temperature, pressure, density, and type of fluid, the engineer or scientist can use the correlations to estimate salt concentration, low and high gravity solid volume percentage, oil-water ratio, and oil phase volume percentage, which can be used to formulate the drilling fluid accordingly.

The parameterized correlations can be used to design new borehole fluids and/or compositions with minimized test requirements, to perform more accurate hydraulics modeling, monitoring, and calibration of fluids and cuttings in a wellbore while circulating, during pump shut-in, when tripping, while displacing another fluid, when injecting to formations and for segregation of solids (e.g. Barite sag), etc. These applications of the parameterized correlations only need the results of a standard wellbore fluid test which can be performed in less time, by a field service engineer, with standard test equipment, even at the well site. Alternatively, multiple wellbore fluid tests at different temperature can be applied.

At block 306, the method includes changing a parameter of a wellbore construction operation at the wellbore based at least in part on the predicted temperature and pressure dependent viscosity data of the wellbore fluid. For example, the predicted temperature and pressure dependent viscosity data can help a field service engineer to design and to optimize the wellbore fluid and to estimate the wellbore fluids additives effects on temperature and pressure dependent rheological properties. In another example, the controller 11 can send signals to the drilling/production rig 10 to alter properties of the wellbore construction operation, such as drilling or tripping speed, rotational speed, pressure, amount of drilling fluid, depth, and the like.

Additional processes also may be included, and it should be understood that the processes depicted in FIG. 3 represent illustrations, and that other processes may be added or existing processes may be removed, modified, or rearranged without departing from the scope and spirit of the present disclosure.

Embodiment 1

A computer-implemented method for performing a wellbore construction operation in a wellbore, the method comprising: performing, by a rheological test setup, a rheology test on a test fluid, the test fluid being representative of a fluid pumped through the wellbore, to generate test fluid data; performing, by a processing device, a data analysis on the test fluid data to generate at least one parameterized correlation; measuring, by a measurement device, a first property of the fluid to generate measured data; calculating, by the processing device, a second property of the fluid in the wellbore by using the parameterized correlations and the measured data to generate calculated data; and changing a parameter of the wellbore construction operation based at least in part on the calculated data.

Embodiment 2

According to at least one of the previous embodiments, the parameter of the wellbore construction operation is a percentage of a component of the fluid.

Embodiment 3

According to at least one of the previous embodiments, the parameterized correlation comprises an analytic equation describing the second property as a function of the first property.

Embodiment 4

According to at least one of the previous embodiments, at least one of the first property and the second property is at least one of a salt concentration, a liquid composition, a weight of the fluid, a density of the fluid, a solid mass or volume percentage, an organic/inorganic phase ratio, a concentration of organic or inorganic phases, a viscometer reading, a temperature, and a pressure.

Embodiment 5

According to at least one of the previous embodiments, the wellbore construction operation is a drilling operation.

Embodiment 6

According to at least one of the previous embodiments, the data analysis includes at least one of a step-wise regression, a robust regression, a curve fitting, classification technique, a data mining technique, a data extraction technique, a stochastic technique, a topological data analysis, and a computational intelligence technique.

Embodiment 7

According to at least one of the previous embodiments, wherein changing the parameter of the wellbore construction operation is performed by executing computer readable instructions stored to a memory.

Embodiment 8

According to at least one of the previous embodiments, further comprising enhancing the at least one parameterized correlation based on at least one of the measured data and the calculated data.

Embodiment 9

According to at least one of the previous embodiments, wherein the changing of the parameter of the wellbore construction operation is performed by the processing device.

Embodiment 10

A system for performing a wellbore construction operation in a wellbore, the system comprising: a rheology test setup configured to determine test data of a test fluid; a measurement device to measure a first property of a fluid flowing through a wellbore; a memory comprising computer readable instructions; and a processing device for executing the computer readable instructions for performing a method, the method comprising: performing, by the processing device, a data analysis on the test fluid data to generate at least one parameterized correlation; calculating, by the processing device, a second property of the fluid in the wellbore by using the at least one parameterized correlation and the measured first property of the fluid to generate calculated data; and changing a parameter of the wellbore construction operation based at least in part on the calculated data.

Embodiment 11

According to at least one of the previous embodiments, the parameter of the wellbore construction operation is a percentage of a component of the fluid.

Embodiment 12

According to at least one of the previous embodiments, the at least one parameterized correlation comprises an analytic equation describing the second property as a function of the first property.

Embodiment 13

According to at least one of the previous embodiments, at least one of the first and second property is at least one of a salt concentration, a liquid composition, a weight of the fluid, a density of the fluid, a solid mass or volume percentage, an organic/inorganic phase ratio, a concentration of organic or inorganic phases, a viscometer reading, a temperature, and a pressure Embodiment 14

According to at least one of the previous embodiments, the wellbore construction operation is a drilling operation.

Embodiment 15

According to at least one of the previous embodiments, the data analysis includes at least one of a step-wise regression, a robust regression, a curve fitting, classification technique, a data mining technique, a data extraction technique, a stochastic technique, a topological data analysis, and a computational intelligence technique.

Embodiment 16

According to at least one of the previous embodiments, the method further comprises enhancing the at least one parameterized correlation based on at least one of the measured data and the calculated data.

Embodiment 17

According to at least one of the previously embodiment, the changing of the parameter of the wellbore construction operation is performed by the processing device.

Example embodiments of the disclosure include or yield various technical features, technical effects, and/or improvements to technology. Example embodiments of the disclosure provide techniques generating parameterized correlations for wellbore fluid to predict temperature and pressure dependent viscosity data for borehole fluid at a wellbore and using the predicted temperature and pressure dependent data to change a parameter of a wellbore construction operation. Moreover, the present techniques can be used to design a wellbore fluid or alter and improve the composition of an existing wellbore fluid. It should be appreciated that the above examples of technical features, technical effects, and improvements to technology of example embodiments of the disclosure are merely illustrative and not exhaustive.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A computer-implemented method for performing a wellbore construction operation in a wellbore, the computer-implemented method comprising:
performing, by a rheological test setup, a rheology test on a test fluid, the test fluid being representative of a fluid pumped through the wellbore, to generate test fluid data;
performing, by a processing device, a data analysis on the test fluid data to generate at least one parameterized correlation comprising a correlation parameter of the test fluid, wherein the correlation parameter of the test fluid is related to at least one of a fluid weight, a fluid density, a concentration/percentage of oil, solids, or salt, a fluid yield stress, a fluid composition, an oil-water-ratio, a phase ratio of organic-to-inorganic matter in the test fluid, and an organic/inorganic phase concentration;
measuring, by a measurement device, a property of the fluid pumped through the wellbore at a first temperature and a first pressure to generate measured data;
receiving at least one of a second temperature and a second pressure;
calculating, by the processing device, the property of the fluid pumped through the wellbore at at least one of the second temperature and the second pressure by using the correlation parameter of the test fluid and the measured data to generate calculated data; and changing a parameter of the wellbore construction operation based at least in part on the calculated data, wherein the at least one parameterized correlation describes the property as a function of pressure or temperature.

2. The computer-implemented method of claim 1, wherein the parameter of the wellbore construction operation is related to a composition of the fluid pumped through the wellbore.

3. The computer-implemented method of claim 1, wherein the at least one parameterized correlation comprises an analytic equation.

4. The computer-implemented method of claim 1, wherein the property is at least one of a salt concentration, a liquid composition, a weight of the fluid pumped through the wellbore, a density of the fluid pumped through the wellbore, a solid mass or volume percentage, an organic/inorganic phase ratio, a concentration of organic or inorganic phases, a viscometer reading, a temperature, and a pressure.

5. The computer-implemented method of claim 1, wherein the wellbore construction operation is a drilling operation.

6. The computer-implemented method of claim 1, wherein the data analysis includes at least one of a step-wise regression, a robust regression, a curve fitting, classification technique, a data mining technique, a data extraction technique, a stochastic technique, a topological data analysis, and a computational intelligence technique.

7. The computer-implemented method of claim 1, wherein changing the parameter of the wellbore construction operation is performed by executing computer readable instructions stored to a memory.

8. The computer-implemented method of claim 1, further comprising enhancing the at least one parameterized correlation based on at least one of the measured data and the calculated data.

9. The computer-implemented method of claim 1, wherein the changing of the parameter of the wellbore construction operation is performed by the processing device.

10. A system for performing a wellbore construction operation in a wellbore, the system comprising:

a rheology test setup configured to determine test fluid data;

a measurement device to measure a property of a fluid flowing through the wellbore;

a memory comprising computer readable instructions; and a processing device for executing the computer readable instructions for performing a method, the method comprising:

performing, by the processing device, a data analysis on the test fluid data to generate at least one parameterized correlation comprising a correlation parameter of the test fluid, wherein the correlation parameter of the test fluid is related to at least one of a fluid weight, a fluid density, a concentration/percentage of oil, solids, or salt, a fluid yield stress, a fluid composition, an oil-water-ratio, a phase ratio of organic-to-inorganic matter in the test fluid, and an organic/inorganic phase concentration;

measuring, by the processing device, the property of the fluid flowing through the wellbore at a first temperature and a first pressure to generate measured data;

receiving at least one of a second temperature and a second pressure;

calculating, by the processing device, the property of the fluid flowing through the wellbore at at least one of the second temperature and the second pressure by using the correlation parameter of the test fluid and the measured data to generate calculated data; and changing a parameter of the wellbore construction operation based at least in part on the calculated data, wherein the at least one parameterized correlation describes the property as a function of pressure or temperature.

11. The system of claim 10, wherein the parameter of the wellbore construction operation is related to a composition of the fluid flowing through the wellbore.

12. The system of claim 10, wherein the at least one parameterized correlation comprises an analytic equation.

13. The system of claim 10, wherein the property is at least one of a salt concentration, a liquid composition, a weight of the fluid flowing through the wellbore, a density of the fluid flowing through the wellbore, a solid mass or volume percentage, an organic/inorganic phase ratio, a concentration of organic or inorganic phases, a viscometer reading, a temperature, and a pressure.

14. The system of claim 10, wherein the wellbore construction operation is a drilling operation.

15. The system of claim 10, wherein the data analysis includes at least one of a step-wise regression, a robust regression, a curve fitting, classification technique, a data mining technique, a data extraction technique, a stochastic technique, a topological data analysis, and a computational intelligence technique.

16. The system of claim 10, wherein the method further comprises enhancing the at least one parameterized correlation based on at least one of the measured data and the calculated data.

17. The system of claim 10, wherein the changing of the parameter of the wellbore construction operation is performed by the processing device.

* * * * *